(12) United States Patent
Borger et al.

(10) Patent No.: US 7,819,253 B2
(45) Date of Patent: Oct. 26, 2010

(54) FILTERING FLOW BOX FOR MOUNTING TO A SILO

(76) Inventors: Ronald E. Borger, 306 E. College St., Coldwater, OH (US) 45828; Troy Steinbrunner, 314 E. College St., Coldwater, OH (US) 45828

( * ) Notice: Subject to any disclaimer, the term of this patent is extended or adjusted under 35 U.S.C. 154(b) by 304 days.

(21) Appl. No.: 12/102,335

(22) Filed: Apr. 14, 2008

(65) Prior Publication Data

US 2009/0255857 A1 Oct. 15, 2009

(51) Int. Cl.
*F24B 15/00* (2006.01)
*B07B 1/00* (2006.01)

(52) U.S. Cl. .................. 209/373; 209/363; 209/370

(58) Field of Classification Search .......... 209/363, 209/370, 373, 244, 257, 312, 320, 404, 571
See application file for complete search history.

(56) References Cited

U.S. PATENT DOCUMENTS

| | | | |
|---|---|---|---|
| 669,205 A | 3/1901 | Messler | |
| 807,522 A | 12/1905 | Warner | |
| 1,044,796 A | 11/1912 | Marquardt | |
| 2,061,179 A * | 11/1936 | Wettlaufer | 209/44 |
| 2,587,686 A | 3/1952 | Berry | |
| 2,968,425 A * | 1/1961 | Paton | 406/90 |
| 3,363,769 A * | 1/1968 | Wilmot et al. | 210/251 |
| 3,917,354 A * | 11/1975 | Adams, Jr. | 406/128 |
| 4,256,572 A * | 3/1981 | Read | 209/257 |
| 5,203,460 A | 4/1993 | Deister et al. | |
| 5,501,343 A | 3/1996 | Hadden | |
| 6,863,182 B2 | 3/2005 | Zeller | |
| 2005/0006284 A1 | 1/2005 | Zeller | |
| 2005/0092659 A1 | 5/2005 | MacNaughton | |
| 2006/0163121 A1 | 7/2006 | Fisher et al. | |
| 2008/0087580 A1* | 4/2008 | Coen | 209/312 |

* cited by examiner

*Primary Examiner*—Gene Crawford
*Assistant Examiner*—Terrell H Matthews
(74) *Attorney, Agent, or Firm*—Jason H. Foster; Kremblas & Foster

(57) ABSTRACT

A filtering flow box for receiving a supply of plastic pellets from a bottom-unloading tower silo and removing undesirable plastic strands ("angel hair") from the pellets before they are processed for manufacturing. The box has an angled entry wall for laterally channeling pellets to an angled filter. The pellets pass through the filter and angel hair collects on the filter's upstream surface. The filter can be removed from the box at an angle having a vertical component for cleaning, thus allowing any pellets that have accumulated on top of the filter to fall back into the box.

8 Claims, 6 Drawing Sheets

FILTERING FLOW BOX FOR MOUNTING TO A SILO

BACKGROUND OF THE INVENTION

1. Field of the Invention

This invention relates generally to a filter for sifting and channeling material flowing out of a bottom-unloading tower silo, and relates more particularly to a filtering flow box for receiving plastic pellets flowing from a bottom-unloading tower silo, sifting unwanted plastic strands ("angel hair") out of the supply of pellets, and channeling the sifted pellets into vacuum feed lines for further processing.

2. Description of the Related Art

Plastic pellets comprise the raw material for many plastic articles of manufacture. Because of their small size and granular nature, such pellets are preferred for their ease of handling and processing. In order to convert plastic pellets into a form that is useable for fabrication, the pellets are melted down, and the resulting molten plastic is subsequently used in processes such as injection molding or blow molding.

Typically, plastic pellets are stored in bottom-unloading tower silos adjacent a processing facility. The pellets are conveyed into the processing facility through vacuum feed-lines when needed. One problem associated with plastic pellets is the formation of so-called "angel hair." Angel hair is thin, elongated plastic strands that result from the unraveling of plastic pellets. During transportation and handling, it is common for a significant quantity of pellets to unravel and form angel hair. Angel hair is generally undesirable because they are not useful for processing, and therefore must be removed from a supply of pellets before use.

Traditionally, the problem of angel hair has been dealt with by mounting a filter box below the outlet of a bottom-unloading tower silo in which plastic pellets are stored. A filter box is generally rectangular in shape and has four side walls, an open top for receiving material, and an open bottom for dispensing material. The top of the box has a flange that is adapted to bolt directly to the edges of an opening on the bottom of the silo. Thus, all of the pellets that fall through the opening (outlet) of the silo must subsequently pass into the attached filter box before being used.

The conventional filter box has a narrow, horizontal slot formed in one of its side walls for accepting a flat, rectangular filter that is formed of slit and expanded metal. Brackets extend from the inner surfaces of the side walls for holding the filter in a perpendicular orientation relative to the flow of material through the box. As plastic pellets fall by gravity from the silo into the box, the pellets, which are slightly smaller than the apertures in the filter, are allowed to pass through the box while most of the angel hair is caught by the filter.

Over time, as angel hair accumulates on the upstream surface of the filter, the apertures of the filter become increasingly clogged and the throughput of pellets steadily decreases. Once the apertures are sufficiently blocked, pellets settle on top of the collected angel hair and cannot pass through. An operator must therefore periodically pull the filter out of the filter box and manually remove the accumulated angel hair from the filter's upstream surface.

A problem that is commonly associated with the procedure of removing and cleaning the filter of a traditional filter box is that a quantity of pellets that accumulate on top of a clogged filter tend to remain on the filter when it is removed from the box. Thus, as an operator pulls the filter out of the box, those remaining pellets roll off the top of the filter and fall to the ground or floor adjacent the operator, creating a mess and a potential slip hazard for the operator and others who may be in the area. Cleaning up the dropped pellets is a tedious and time consuming task.

Once the plastic pellets have been sifted through the filter box, they fall into a flow box that is mounted to the bottom of the filter box. The flow box is similar to the filter box in size and shape, but has a closed bottom. Vacuum feed-lines are connected to outlet ports formed in a side wall of the flow box. The feed lines remove pellets that accumulate in the box and convey them into an adjacent processing facility.

BRIEF SUMMARY OF THE INVENTION

It is a first purpose of the present invention to provide a filtering flow box having a filter that can be conveniently removed, cleaned, and replaced without creating a mess or a hazard.

It is a second purpose of the present invention to provide a filtering flow box that is compact and inexpensive.

It is a third purpose of the present invention to provide a filtering flow box having a filter that is less prone to clogging than those found in the prior art.

In accordance with the purposes of the present invention, there is provided a one-piece filtering flow box for removing angel hair from a supply of plastic pellets. The filtering flow box has a main housing with an open top. The housing has a floor, two side walls, a rear wall, and an entry wall. The entry wall extends outwardly from the floor at a preferred angle of 135 degrees. A removable filter is held intermediate the rear wall and the entry wall at a preferred angle of 45 degrees relative to the floor. The filter is formed of perpendicularly-interlacing cross members that define a plurality of rectangular apertures. As compared to the diamond-shaped apertures of traditional slit and expanded filters, the rectangular apertures offer a greater amount of open area through which plastic pellets may fit. The inventive filter thus provides greater throughput and clogs less frequently than traditional filters.

The filtering flow box has a flange that mounts to the outlet port of a bottom-unloading silo in the manner of a conventional filter box. When the box is in an operative orientation, the entry wall is positioned directly below the silo's outlet port. Thus, as plastic pellets are released from the silo, they fall by gravity onto the entry wall of the box and are subsequently channeled toward the removable filter. As the pellets fall through the apertures in the filter, angel hair collects on the filter's upstream surface. The filtered pellets are then collected by vacuum feed-lines that are connected to outlet ports in the rear wall of the box.

In order to remove the filter for cleaning, a cover located on top of the main housing adjacent the mounting flange is opened and the filter is slidably withdrawn. Because the filter is angled, any plastic pellets that had accumulated on the clogged upstream surface of the filter roll off the filter as it is pulled out of the housing. All of the pellets thus remain within the housing, thereby allowing the filter to be conveniently cleaned without creating a mess.

Additionally, the compact, one-piece construction of the filtering flow box requires less material to produce and requires less space than traditional, multi-piece filter and flow boxes. The filtering flow box can therefore be produced at a lower cost and can be used in a greater variety of application environments than traditional boxes.

DETAILED DESCRIPTION OF THE DRAWINGS

Figure 1:
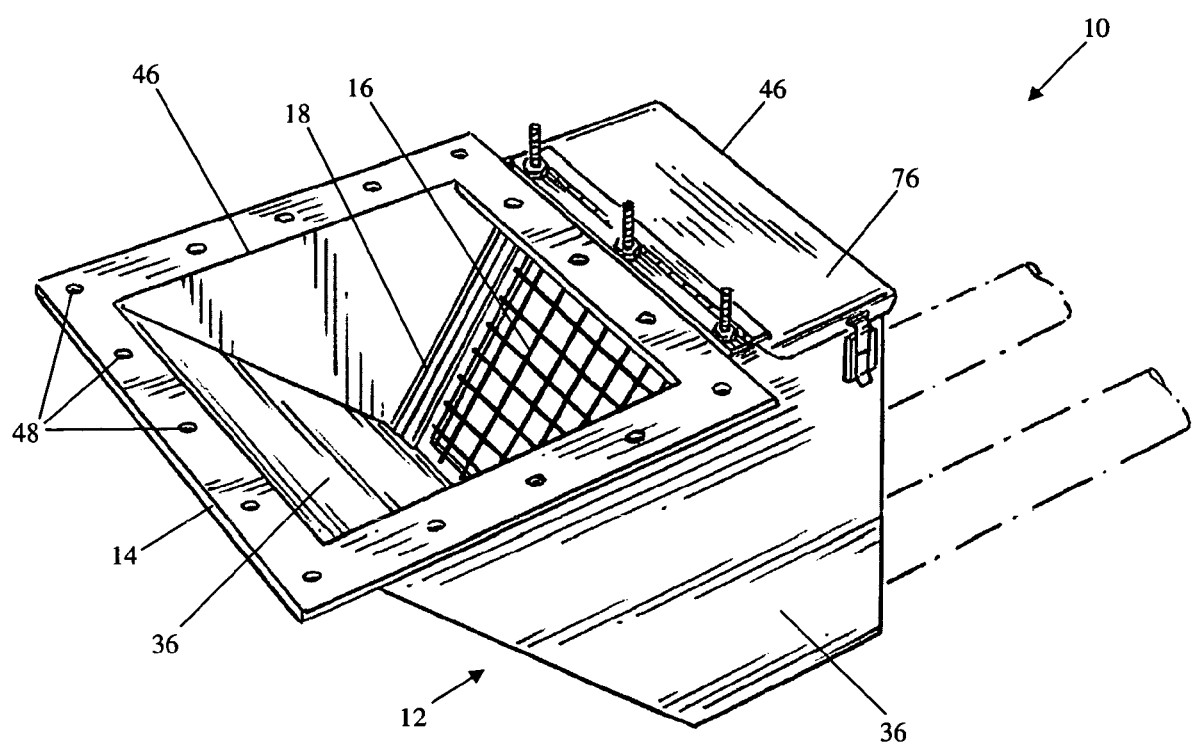
FIG. 1 is a perspective view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Referring to FIGS. 1-4 and 8, the filtering flow box 10 has a main housing 12, a mounting flange 14, a removable filter 16, two filter guides 18 and 20, a filter cover assembly 22, and two feed-line clamps 24 and 26. All components of the box 10 are formed of stainless steel unless otherwise noted, although all other materials that are sufficiently rigid and durable, such as aluminum, iron, and various plastics and composites, are contemplated as will be understood by the person having ordinary skill. For the sake of convenience and clarity, terms such as "front," "rear," "top," "bottom," "up," "down," "inwardly," "outwardly," "lateral," and "longitudinal" will be used herein to describe the relative placement and orientation of various components of the invention, all with respect to the geometry and orientation of the filtering flow box 10 as it appears in FIG. 1 as mounted in an operable orientation. Said terminology will include the words specifically mentioned, derivatives thereof, and words of similar import.

Still referring to FIGS. 1-4, the main housing 12 is a box-shaped container having an open top. The housing 12 is defined by a floor 28, a rear wall 30, two side walls 32 and 34, and an entry wall 36. The floor 28 is rectangular in shape and preferably measures 10 inches square. The rear wall 30 extends perpendicularly upward from the rear edge of the floor 28 to a preferred height of 12 inches. The entry wall 36 extends upwardly and outwardly from the front edge of the floor 28 at a preferred angle of 135 degrees, although any angle in the range of about 120 degrees to about 150 degrees is contemplated. The entry wall 36 extends to a preferred height of 12 inches. The side walls 32 and 34 extend perpendicularly upward from the lateral edges of the floor 28 to a preferred height of 12 inches, and extend longitudinally forward and rearward to the lateral edges of the entry wall 36 and the rear wall 30. The adjoining edges of the floor 28, side walls 32 and 34, entry wall 36, and rear wall 30 are secured to one another by welds, although all other means for rigidly fastening the components to one another, such as with adhesives or fasteners, are contemplated. It is further contemplated that two or more of the walls 30-36, or the floor 28 and one or more of the walls 30-36, may be formed of a single piece of bent sheet-metal.

The mounting flange 14 is preferably a flat, rectangular body having four sides 38, 40, 42, and 44 that define a central inlet port 46. The outer edge of the flange 14 preferably measures 16 inches square and the inner edge of the flange 14 (i.e., the outer edge of the inlet port 46) preferably measures 10 inches square. The flange 14 is rigidly mounted to the top of the main housing 10 with the inner front edge of the flange 14 being welded to the top edge of the entry wall 36 and the inner lateral edges of the flange 14 being welded to the top edges of the side walls 32 and 34. Thus, the front side 38 of the mounting flange 14 extends forward from the top edge of the entry wall 36, the lateral sides 40 and 42 of the flange 14 extend laterally outwardly from the top edges of the side walls 32 and 34, and the rear side 44 of the flange extends laterally across and between the side walls 32 and 34.

Figure 2:
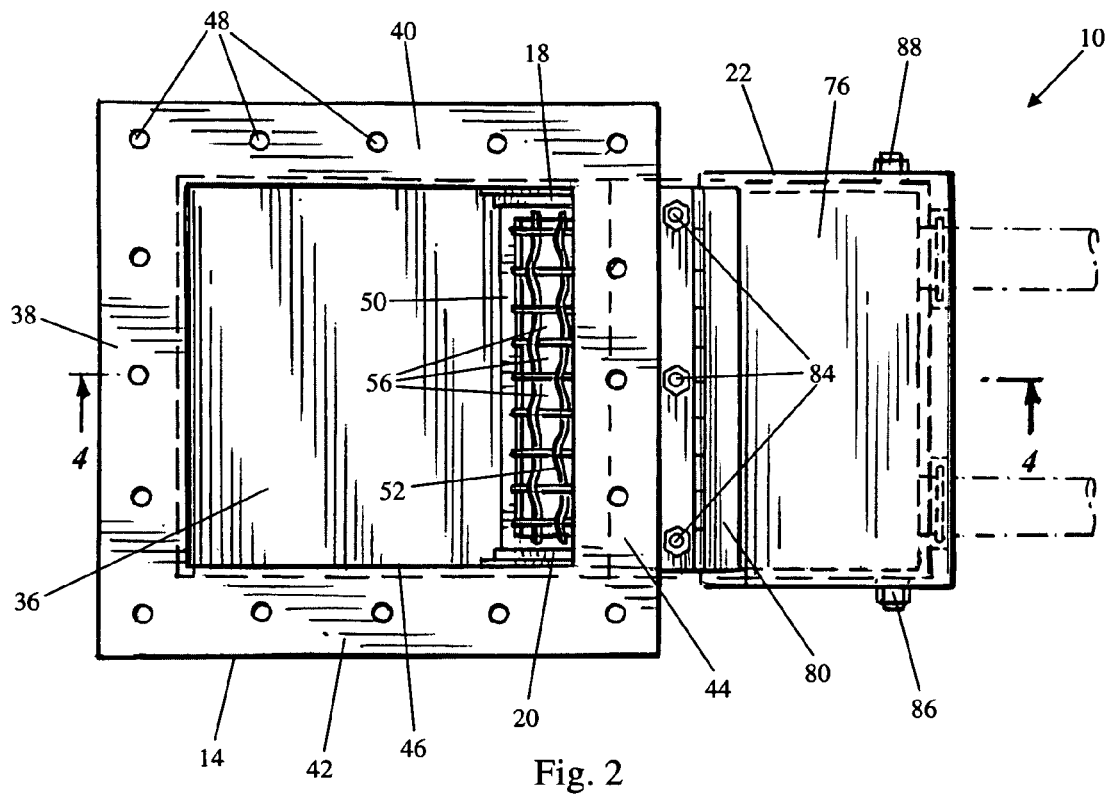
FIG. 2 is a top view illustrating the preferred embodiment of the present invention shown in FIG. 1.

Referring now to FIGS. 1 and 2, the mounting flange 14 has a series of mounting apertures 48 formed through it. The apertures 48 are preferably spaced evenly about the flange 14 and are configured to allow the flange 14 to be fastened to a conventional silo outlet port. When the filtering flow box 10 is in an operative position below a silo, for example, the top surface of the mounting flange 14 flatly abuts a conventional receiving flange extending from the silo's outlet port. Each of the mounting apertures 48 is aligned with an aperture in the receiving flange, and a removable fastener, such as a bolt, is threaded through each pair of aligned apertures and is secured with a nut. Alternatively, it is contemplated that the mounting apertures 48 may be omitted, and that the flange 14 can be mounted to a silo outlet port by any other suitable means, such as by clamping or welding.

Figure 4:
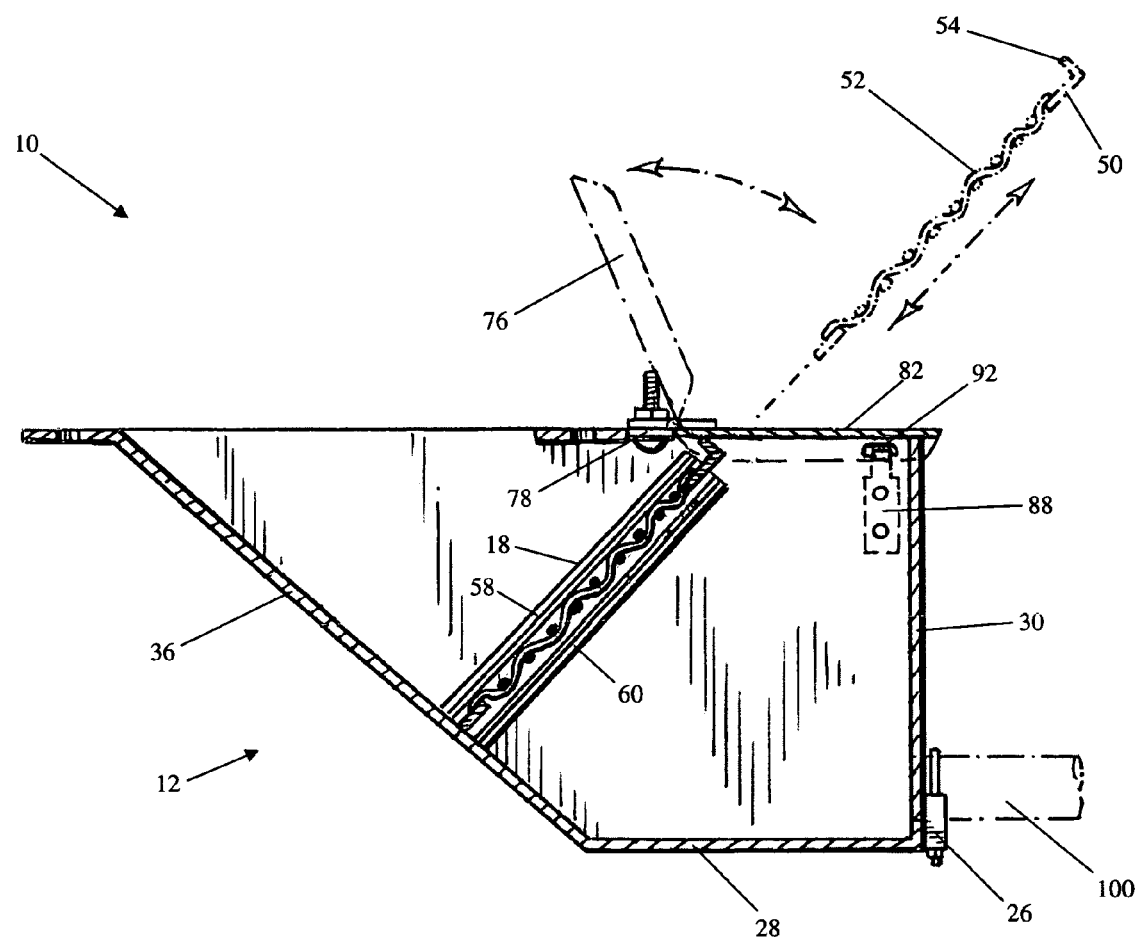
FIG. 4 is a right side view in section through the line 4-4 of FIG. 2 illustrating the preferred embodiment of the present invention shown in FIG. 1.

Referring to FIGS. 1, 2, and 4, the removable filter 16 is preferably a planar, rectangular body having a border element 50 (see FIG. 5) that frames, and that is rigidly affixed to, a screen element 52. The outer edge of the border element 50 preferably measures 10 inches square, and the inner edge of the border element preferably measures 9 inches square. The border element 50 has a lip 54 extending perpendicularly from its top edge for allowing an operator to easily grip the filter 16 and to rigidify the filter 16.

The screen element 52 is formed of a conventional metal screen having a plurality of perpendicularly-interlacing cross-members that define a plurality of rectangular filter apertures 56. Each of the filter apertures 56 preferably measures 3/4 inches square for allowing plastic pellets of a standard size (e.g., one-quarter inch) to pass through while at the same time allowing the filter 16 to effectively catch and retain strands of angel hair on its upstream surface. Although it is preferred that the screen element 52 be formed of interlacing cross-members, it is contemplated that any other filter means, such as slit and expanded sheet metal or drilled sheet metal, can alternatively be used.

Figure 5:
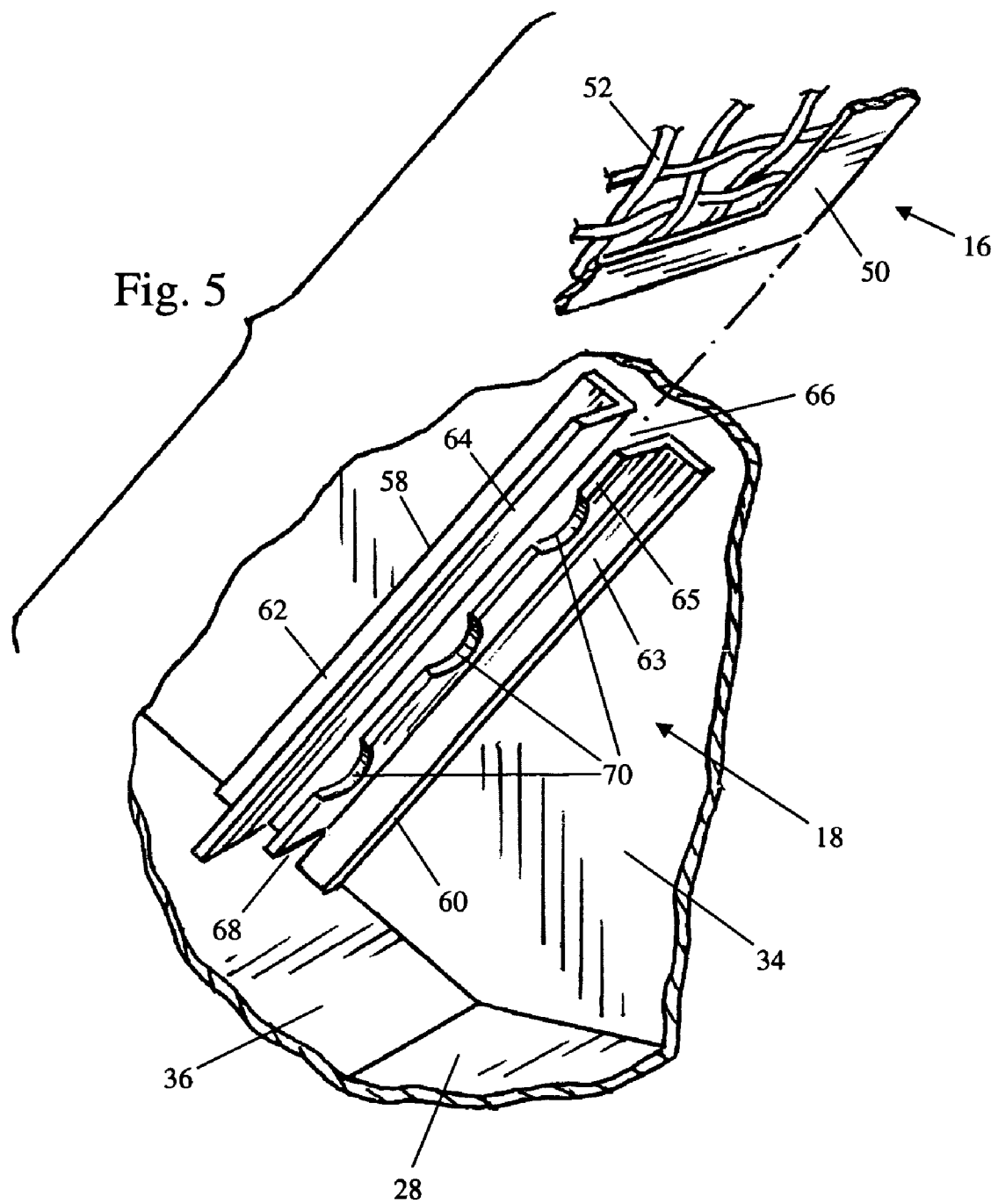
FIG. 5 is a cut-away view illustrating a filter guide of the preferred embodiment of the present invention shown in FIG. 1.

Referring now to FIGS. 1, 4, and 5, each of the filter guides 18 and 20 (filter guide 20 is not shown, but is a mirror image of guide 18) is preferably formed of an elongated upstream bracket 58 and an elongated downstream bracket 60. The brackets 58 and 60 are mounted to the interior surfaces of the side walls 32 and 34 in a parallel orientation. Each bracket 58 and 60 is L-shaped with planar mounting portions 62 and 63 and planar retaining portions 64 and 65. The mounting portions 62 and 63 flatly abut, and are welded to, the interior surface of the side wall 34. The retaining portions 64 and 65 of the brackets extend perpendicularly from their respective mounting portions 62 and 63 into the main housing 12, with the retaining portion 64 of the upstream bracket 58 facing the retaining portion 65 of the downstream bracket 60. The brackets 58 and 60 are spaced apart from one another to form an elongated retaining channel 66 therebetween. The width of the channel 66 is slightly greater than the thickness of the border element 50 of the filter 16, thus allowing the filter 16 to slidably engage the channel 66. The channel 66 extends from the entry wall 36 at a preferred angle of 45 degrees relative to the floor 28 (thus 90 degrees to the entry wall 36), although any angle in the range of about 30 degrees to about 60 degrees is contemplated. Thus, when the removable filter 16 is in an operative position within the main housing 12, a lateral edge of the border element 50 seats within the retaining channel 66 and the bottom edge of the border element 50 seats against the entry wall 36.

The upstream bracket 58 extends from the entry wall 36 to a point adjacent the top edge of the side wall 34. The downstream bracket 60 extends from a point that is preferably spaced ½ inch from the entry wall 36 to a point adjacent the top edge of the side wall 34, thus leaving a gap 68 between the bottom of the downstream bracket 60 and the entry wall 36. A series of semi-circular notches 70 are formed in the retaining portion 64 of the downstream bracket 60. The gap 68 and the notches 70 prevent the accumulation of pellets in the retaining channel 66 when the filter 16 is not present, and also allow pellets to exit the channel 66 when the filter 16 is inserted. For example, when the filter 16 is removed for cleaning, plastic pellets are allowed to accumulate in the housing 12. As the pellets pile vertically over the guide 18, the channel 66 may become filled with pellets. When the operator pushes the filter 16 back into channel 66, the gap 68 and the notches 70 provide outlets for the pellets in the channel 66 to escape, thus allowing the filter 16 to be inserted with minimal resistance.

Figure 6:
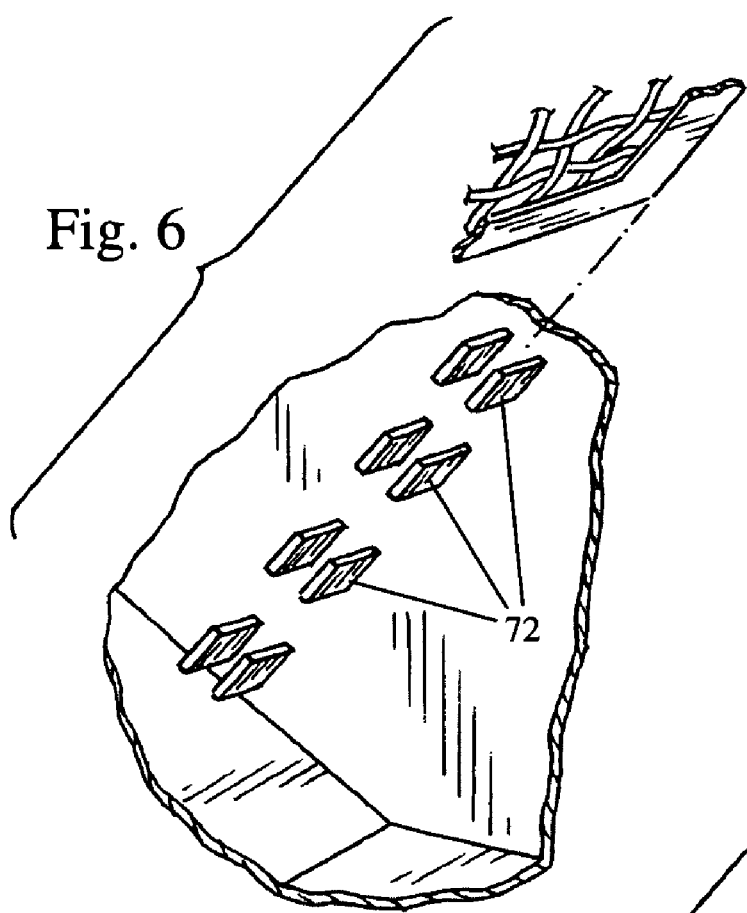
FIG. 6 is a cut-away view illustrating a first alternative filter guide.
Figure 7:
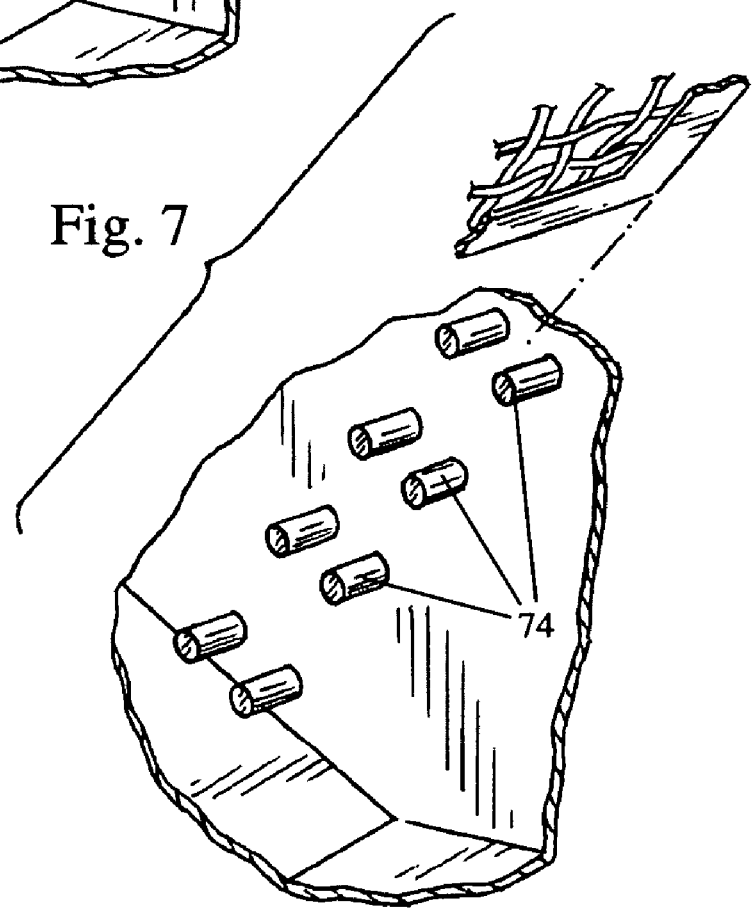
FIG. 7 is a cut-away view illustrating a second alternative filter guide.

Although it is preferred that the filter guides 18 and 20 be formed of brackets like those described above, it is contemplated that any suitable retaining means can be used to slidably hold the filter 16 in place. For example, the brackets 58 and 60 may be replaced by a series of flat, rectangular tabs 72 (as shown in FIG. 6). Alternatively, the brackets 58 and 60 may be replaced by a series of round pins 74 (as shown in FIG. 7). It is further contemplated that the upstream portion of each filter guide may be structurally different than the downstream portion of the guide. For example, an embodiment of the invention is contemplated wherein the upstream portion of each filter guide is formed of a bracket similar to the upstream bracket 58 shown in FIG. 5, and wherein the downstream portion of each guide is formed of a series of round pins like those shown in FIG. 7. Regardless of the type, or types, of filter guides that are incorporated in a particular embodiment, it is preferred that the downstream portion of each guide have a means for allowing accumulated plastic pellets to escape the retaining channel, such as the gap 68 and notches 70 shown in FIG. 5, the spaces between the tabs 72 shown in FIG. 6, or the spaces between the pins 74 shown in FIG. 7.

Referring now to FIGS. 1-4, the filter cover assembly 22 is defined by a cover plate 76 that is pivotably mounted to a mounting plate 78 by a hinge 80. The mounting plate 78 is a planar, rectangular body that is rigidly mounted to the top of the main housing 12. The front edge of the plate 78 abuts the rear edge of the mounting flange 14 and the lateral edges of the plate 78 are welded to the top edges of the side walls 32 and 34. The rear edge of the mounting plate 78, along with the top edges of the side walls 32 and 34 and the top edge of the rear wall 30, define a filter access port 82 in the top of the main housing 12. The tops of the filter guides 18 and 20 are located directly below the access port 82 (see FIG. 4), thus allowing the removable filter 16 to be conveniently inserted into, and withdrawn from, the guides 18 and 20 through the port 82.

Figure 3:
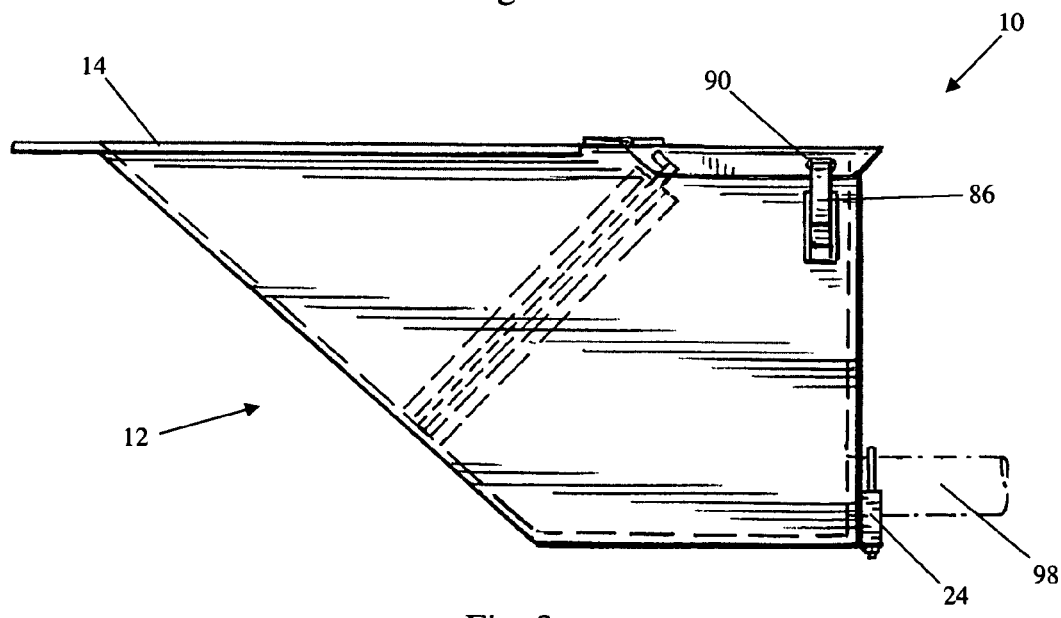
FIG. 3 is a right side view illustrating the preferred embodiment of the present invention shown in FIG. 1.

The cover plate 76 is a substantially planar, rectangular body having downwardly-bent lateral edges for fitting over, and completely covering, the filter access port 82. The hinge 80 is welded to the top surface of the cover plate 76 and is fastened to the mounting plate 78 by a series of removable fasteners 84. The removable fasteners 84 are preferably conventional nut and bolt combinations, although it is contemplated that any other means of mounting the hinge 80 to the mounting plate 78, such as by welding or with adhesives, may alternatively be used. The cover plate 76 may thus be rotated about the axis of the hinge 80 between a closed position (as shown in FIG. 3) and an open position (as shown in FIG. 4). When the filter 16 is not being accessed, the cover plate 76 should be kept in the closed position for preventing external elements, such as water and debris, from entering the main housing 12. Conventional draw-latches 86 and 88 are preferably mounted adjacent the top edges of the side walls 32 and 34 for releasably engaging locking apertures 90 and 92 that are formed in the downwardly-bent portions of the cover plate 76, thereby allowing the cover plate 76 to be locked in the closed position.

Although it is preferred that the cover plate 76 be pivotably mounted relative to the main housing 12, it is contemplated that the hinge 80 and the mounting plate 78 may be omitted, and that the cover plate 76 may be completely removable from the main housing 12. It is further contemplated that the entire filter cover assembly 22 may be omitted, and that the filter access port 82 can be left open.

Figure 8:
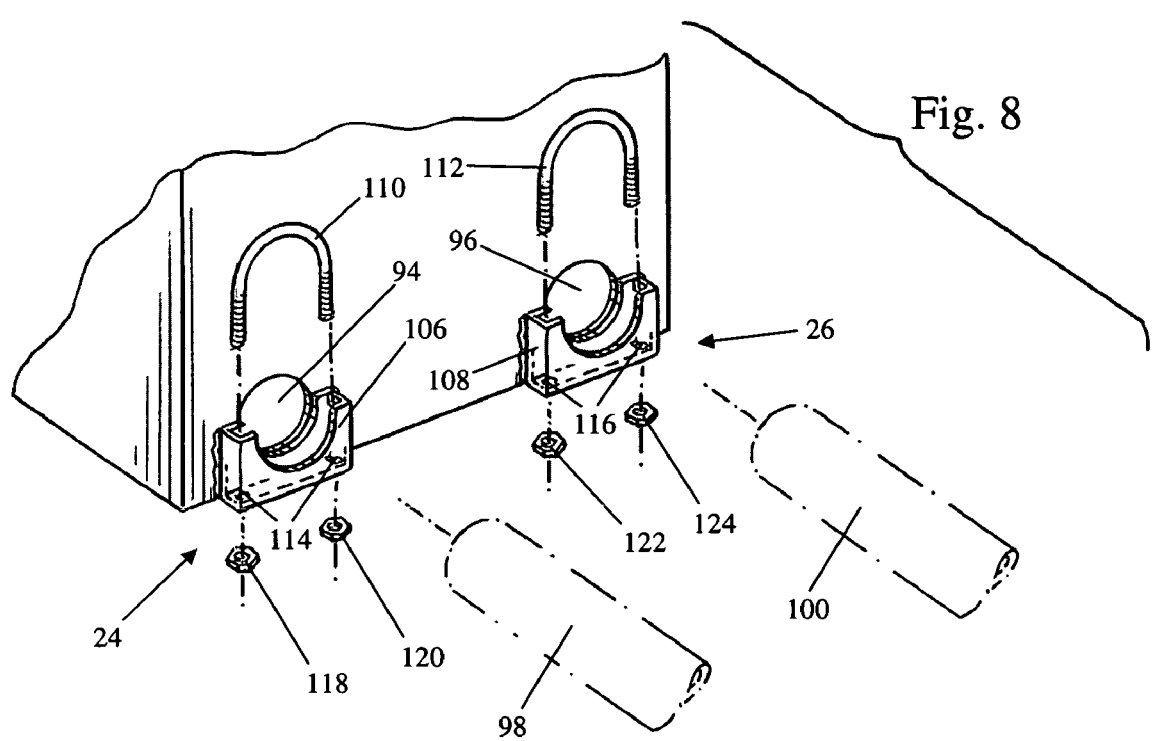
FIG. 8 is a detail view illustrating the feed-line clamps of the preferred embodiment of the present invention shown in FIG. 1.

Referring now to FIGS. 3, 4, and 8, two circular feed-line ports 94 and 96 are formed in the bottom of the rear wall 30. Vacuum feed-lines 98 and 100 engage the ports 94 and 96 in a conventional manner for drawing filtered plastic pellets out of the main housing 12. Feed-line clamps 24 and 26 are provided for holding the feed-lines 98 and 100 in secure engagement with the ports 94 and 96.

Each of the feed-line clamps 24 and 26 has a U-shaped retaining bracket 106 and 108 and a cooperative U-shaped retaining collar 110 and 112 having threaded ends. The retaining brackets 106 and 108 are welded to the exterior surface of the rear wall 30 adjacent the feed-line ports 94 and 96. Each of the brackets 106 and 108 has a pair of apertures 114 and 116 formed in its bottom surface for receiving the threaded ends of its cooperating retaining collar 110 and 112, and each threaded end is secured on the bottom side of the bracket by a nut 118, 120, 122, and 124. As the nuts 118-124 are tightened, the clamps 24 and 26 tighten around their respective feed-lines 98 and 100, thus preventing the lines 98 and 100 from becoming disengaged from the ports 94 and 96. Although the feed-line clamps 24 and 26 are the preferred means for securing the vacuum feed lines 98 and 100, all other means for securing the lines, such as by conventional, tubular feed-line sleeves, are contemplated.

Although the filtering flow box 10 is shown as having two feed-line ports 94 and 96 and two feed-line clamps 24 and 26, it is contemplated that the box 10 may have as many or as few ports and clamps as are necessary to accommodate the number of feed-lines present in a particular instance. It is further contemplated that the feed-line ports 94 and 96 and clamps 24 and 26 can alternatively be located on either of the side walls 32 and 34 or on the floor 28.

During typical operation, the filtering flow box 10 is mounted to a bottom-unloading tower silo with the entry wall 36 positioned directly below the outlet port of the silo and with the filter access port 82 positioned laterally adjacent the outlet port. As plastic pellets and angel hair fall from the outlet port through the inlet port 46 and onto the entry wall 36, they roll and slide down the wall 36 toward the removable filter 16. Initially, the pellets and angel hair engage the bottom portion of the filter 16. After the bottom portion of the filter 16 becomes clogged, the incoming pellets and angel hair will accumulate against the clogged area and will begin to pile vertically. As the pellets and hair pile up, they engage more elevated areas of the filter 16. As those elevated areas of the filter 16 become clogged, the pellets will pile still higher, thus clogging the filter 16 from bottom to top.

After the filter 16 is substantially clogged and the throughput of pellets becomes sufficiently diminished, an operator unlocks the draw latches 86 and 88 and pivots the cover plate 76 to the open position. The operator then grasps the lip 54 of the filter 16 and withdraws the filter 16 from the guides 18 and 20. As the filter 16 slides out of the box at an angle, the pellets that had accumulated on the filter's clogged surface will roll and slide by gravity off the filter, thus remaining in the housing 12. After the accumulated angel hair has been removed from the upstream surface of the filter 16, the operator reinserts the edges of the filter 16 into the guides 18 and 20 and slides the filter 16 back into the housing 12. The operator then pivots the cover plate 76 back to the closed position and secures the draw latches 86 and 88.

Many components of the filtering flow box 10 have been described above as having a particular size and/or shape. It is contemplated, however, that these components can have any other size or shape, as long as the same general spatial relationships and fitment constraints as those described above are adhered to. For example, the side walls 32 and 34 can alternatively extend away from one another as they extend upwardly from the floor, thereby requiring the entry wall 36, the filter 16, and the rear wall 30 to be trapezoidal in shape. In another example, the filter apertures 56 can be made larger or smaller for accommodating different sizes of plastic pellets. Still further, and more broadly, the dimensions of some or all of the filtering flow box 10 components may be varied to accommodate larger or smaller silos, or to accommodate greater or lesser amounts of material throughput.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved filtering flow box having a floor, two side walls, a rear wall, an inlet port, at least one feed-line port, a removable filter, and a mounting flange extending from a periphery of the inlet port that is configured to engage a conventional silo outlet port, the improvement comprising:

(a) an entry wall extending from the floor at an angle in a range of about 120 degrees to about 150 degrees, the entry wall being opposite the rear wall and intermediate the side walls;

(b) at least two filter guides extending from the side walls into the filtering flow box for removably holding the filter intermediate the entry wall and the rear wall at an angle in a range of about 30 degrees to about 60 degrees relative to the floor; and (c) a filter access port adjacent an edge of the filter for allowing access to the filter, wherein the filter slidably engages the filter guides, each of said at least two filter guides comprises an elongated upstream rail and an elongated downstream rail, wherein the rails are parallel to one another and spaced apart from one another to form a channel therebetween, and wherein an edge of the filter slidably fits within each channel.

2. The improved filtering flow box in accordance with claim 1, further comprising a plurality of notches formed in the downstream rail.

3. The improved filtering flow box in accordance with claim 1, wherein the removable filter comprises a screen having a plurality of rectangular apertures.

4. The improved filtering flow box in accordance with claim 3, wherein each of the rectangular apertures is square and has outer dimensions in a range of about $1/10"\times1/10"$ to about $5"\times5"$.

5. The improved filtering flow box in accordance with claim 4, wherein each of the apertures has outer dimensions in a range of about $3/4"\times3/4"$ to about $1"\times1"$.

6. The improved filtering flow box in accordance with claim 1, wherein the filter port has a removable cover.

7. The improved filtering flow box in accordance with claim 6, wherein the removable cover is hingedly mounted to the filtering flow box.

8. An improved filtering flow box having a floor, two side walls, a rear wall, an inlet port, at least one feed-line port, a removable filter, and a mounting flange extending from a periphery of the inlet port that is configured to engage a conventional silo outlet port, the improvement comprising:

(a) an entry wall extending from the floor at an angle in a range of about 120 degrees to about 150 degrees, the entry wall being opposite the rear wall and intermediate the side walls;

(b) at least two filter guides extending from the side walls into the filtering flow box for removably holding the filter intermediate the entry wall and the rear wall at an angle in a range of about 30 degrees to about 60 degrees relative to the floor;

(c) a filter access port adjacent an edge of the filter for allowing access to the filter; and (d) at least one feed-line clamp having a retaining bracket and a cooperating u-shaped retaining collar for fitting around a feed-line, the retaining bracket mounted adjacent said at least one feed-line port and having two apertures formed through it, the retaining collar having two threaded ends that engage a first side of the apertures and that are secured on a second side of the apertures by a nut.

* * * * *